United States Patent [19]

Loucks

[11] Patent Number: 4,908,626
[45] Date of Patent: Mar. 13, 1990

[54] COMMUNICATION SYSTEM FOR RADAR GROUND SYSTEMS

[75] Inventor: Richard S. Loucks, Northridge, Calif.

[73] Assignee: ITT Corporation, New York, N.Y.

[21] Appl. No.: 385,625

[22] Filed: Jul. 26, 1989

Related U.S. Application Data

[60] Division of Ser. No. 8,066, Jan. 13, 1987, Pat. No. 4,866,447, which is a continuation of Ser. No. 645,983, Aug. 31, 1984, abandoned.

[51] Int. Cl.$^4$ .............................................. G01S 13/86
[52] U.S. Cl. ..................................................... 342/60
[58] Field of Search ...................... 455/42, 60; 375/52, 375/55; 342/60

[56] References Cited

U.S. PATENT DOCUMENTS

| | | | |
|---|---|---|---|
| 3,335,369 | 8/1967 | Priebe | 375/52 |
| 3,919,641 | 11/1975 | Kurokawa et al. | 375/52 X |
| 4,130,802 | 12/1978 | Nossen et al. | 375/55 |
| 4,733,238 | 3/1988 | Fiden | 342/60 |

Primary Examiner—Thomas H. Tarcza
Assistant Examiner—Mark Hellner
Attorney, Agent, or Firm—Thomas N. Twomey; Mary C. Werner

[57] ABSTRACT

A first plurality of spaced radar ground systems and a second plurality of radar ground systems positioned in between adjacent pairs of the first systems. The first systems, when employed in an early warning radar chain, preferably have antennas which are mechanically rotatable. The second systems are then provided with phased arrays to enable two-way communication without it being necessary to stop any scanning movement of a corresponding first system antenna.

1 Claim, 5 Drawing Sheets

SWITCH POSITION

AMPLIFIER OUTPUT

OSCILLATOR 0° OUTPUT

OSCILLATOR 180° OUTPUT

TRANSMITTER WAVEFORMS

RECEIVER

T0 SIGNAL — φ (REF)

T1 SIGNAL

T2 SIGNAL

T3 SIGNAL

T4 SIGNAL

CLOCK $d_1$ $d_2$ $d_3$ $d_4$

RECEIVER WAVEFORMS

COMMUNICATION SYSTEM FOR RADAR GROUND SYSTEMS

This is a division of application Ser. No. 07/008,066 now U.S. Pat. No. 4,866,447, filed Jan. 13, 1987 which is a continuation of application Ser. No. 06/645,983 filed Aug. 31, 1984, now abandoned.

BACKGROUND OF THE INVENTION

This invention relates to radar ground systems, and more particularly to means for establishing communication between two radars via the self same antenna structures that are employed in making range and angle determinations.

PRIOR ART STATEMENT

It is known that plural radar ground systems are employed in an early warning chain to provide a radar fence. For example, DEWLINE is provided in the northern part of North America. Such radar sites require a site to site data link for target detection, alarms, plot extractions, system status/availability; and so forth.

Normal communications techniques require land lines or radio links. Unfortunately, land lines may be prohibitively expensive, especially when installed over rough terrain in a non-benign environment as is usually the case in areas where radar fences are required. Further, radio data links have problems. For example, they require complex antenna systems and receivers and transmitters. Also, they are subject to atmospherics and man made and/or natural jamming. Hardware reliability enters into the system availability parameter, and power resources at remote untended sites are usually very limited.

SUMMARY OF THE INVENTION

In accordance with the system of the present invention, the above-described and other disadvantages of the prior art are overcome by providing means for aligning a phased array beam at a first site on a time shared basis with the other sites in a fence. The next site directs its antenna at the first during a portion of a scan. The two then communicate any desired data messages over the two way link so established.

It would normally be extremely difficult to guarantee that two such sites could hold their antennas lined up with the required accuracy for long enough to establish the link especially because of the inertia of the second site antenna. That is, with the mechanically rotating antennas as are normally used in the applications of this sort, the mechanical or inertia problems of holding a point, then returning to a rotating search mode would seriously reduce the coverage utility of the system. On the other hand, an inertialess electronically scanning antenna (the phased array) has the capability of beam steering to a high degree of precision and on a nearly instantaneous basis. When a system of this type is available, communications via a radar link are entirely feasible.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
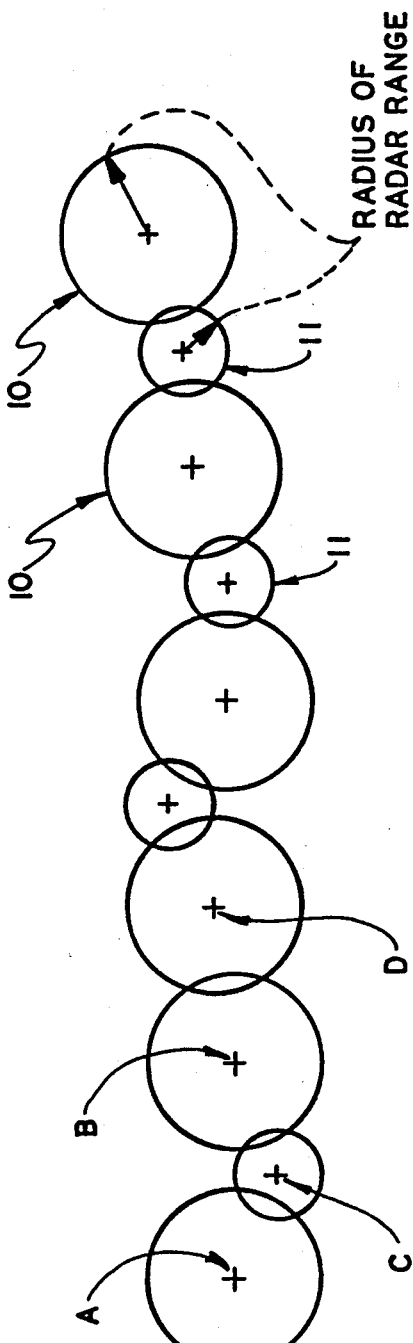
FIG. 1 is a diagrammatic view of a series of radar sites for establishing a radar fence in accordance with the present invention.

In the drawings in FIG. 1, a plurality of radar ground systems are located at sites 10. If provided with suitable power, systems at 10 could provide a radar fence. However, to fill in coverage gaps, plural radar ground systems at sites 11 are needed.

The systems at sites 10 have antennas rotatable about approximately vertical axes scanning in azimuth. The systems at sites 11 are provided with phased arrays.

Figure 2:
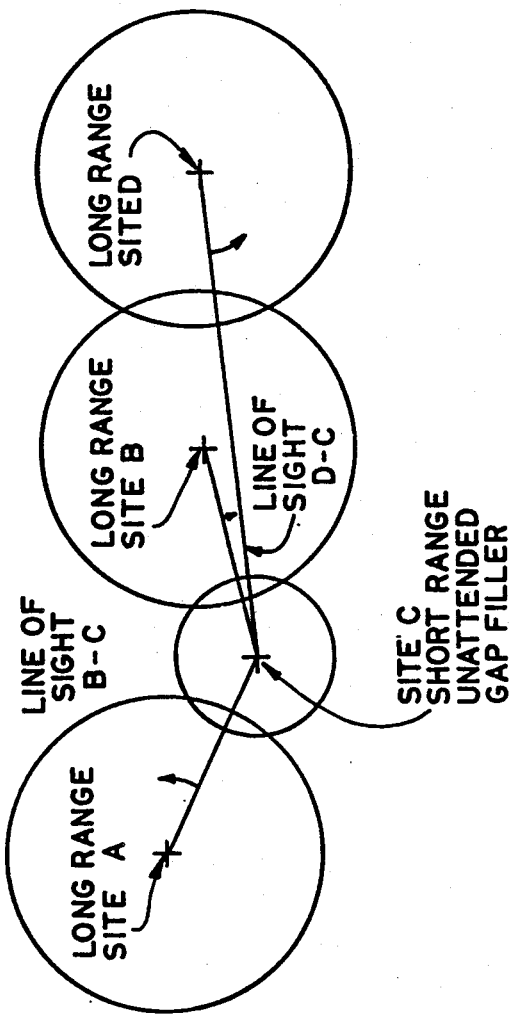
FIG. 2 is an enlarged diagrammatic view of four sites shown in FIG. 1.

Particular sites A, B and D in series 10 are shown in FIG. 2 with a site C in series 11.

As an example of the present invention, the sites A, B, C and D may be used in an early warning/air defense chain (10,11), composed of minimally attended radar sites A, B and D with mechanically scanned antennas and one relatively short range unattended radar with electronic scanning used at site C partially as a low level gap filler.

The site C radar directs a phased array beam toward site A and waits until it detects site A radar transmission. At this point, an internal clock starts, allowing site C, based on site A's known scan rates, to predict when the next scan would bring the site A antenna into alignment with site C. Simultaneously, C transmits a coded pulse which is detected and decoded by site A. A two way "conversation" then is conducted until all necessary data is transmitted. By careful consideration of expected message arrival times, both sites can continue their normal search/track functions with little performance loss due to the data transmission period.

After initial acquisition of data and scan timing of site A, site C begins listening along the vector toward site B and acquires data and scan timing from that site.

After timing schedules have been initialized at site C, it can return to its normal mode of operation except during the periods when either site A or B are aligned with it.

One outstanding advantage of the present invention is that, while the radar range of a site is limited to an inverse fourth power of distance due to the two way radar operation, in the message transmission mode, the beacon equation applies leaving range proportional to an inverse square of distance where sites are in line-of-sight (LOS) of each other.

Figure 2A:
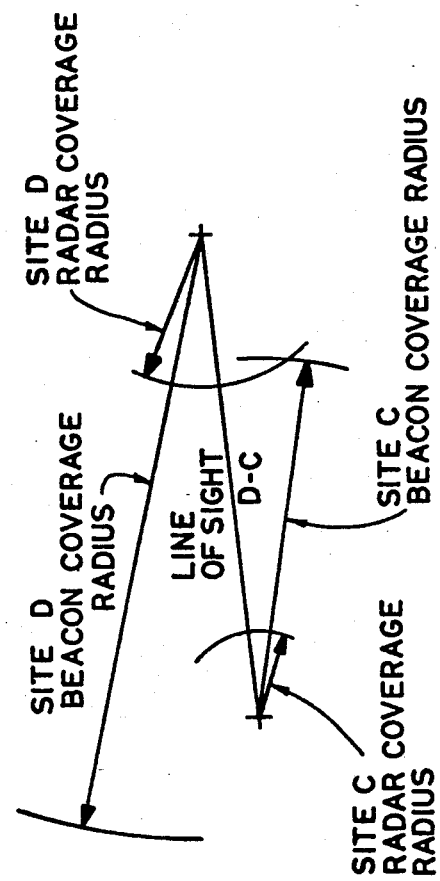
FIG. 2a shows the detailed view of two stations.

Operation in the beacon mode allows a significant increase in the possible separation between sites. Thus, in FIG. 1, the sites are spaced to ensure continuous radar coverage of the fence zone. In the case of data communications, the beacon range is nominally four times the radar range. This allows one series 11 system (FIG. 1) to service the data communications requirements of several series 10 system installations. For example, in FIG. 2A, although the radar ranges of sites C and D do not overlap, the beacon coverage does, and with a significant surplus, in the line-of-sight case.

A solution to the problem of the non-LOS case is the use of a simple, low cost repeater or passive reflector at a point within the LOS of both sites in the pair.

Another technique which is applicable is the use of tropospheric scatter. Since both sites have high gain directional antennas, and since, based on the inverse square law, both have a power surplus relative to the LOS requirements, fading effects can be minimized.

While certain effects of tropospheric scatter are poorly understood, especially in extremely high gain antenna applications, considerable experimental data is available. For example, see *Engineering Handbook*, Donald H. Hamsher, McGraw-Hill, pg. 16-5, 16-30, 16-36 and 16-39 to 16-41.

In many cases, system reliability requirements will call for primary and backup systems for data transmission. In these applications, the technique described here can be used as either a primary channel, conserving energy otherwise required for radio/satellite links, or as an emergency backup link to bypass defective primary equipment.

Once the system is in operation, data can be transmitted in either direction along the site chain from any station to any other site with the only provision being that fixed site stations with mechanically scanned antennas must be paired with sites with electronically scanned antennas.

It is another advantage of this approach that it is available using much hardware already required to meet the radar system functional needs. Additional hardware necessary to provide control and data interface is relatively inexpensive compared to the costs of additional backup communications channels.

Figure 3:
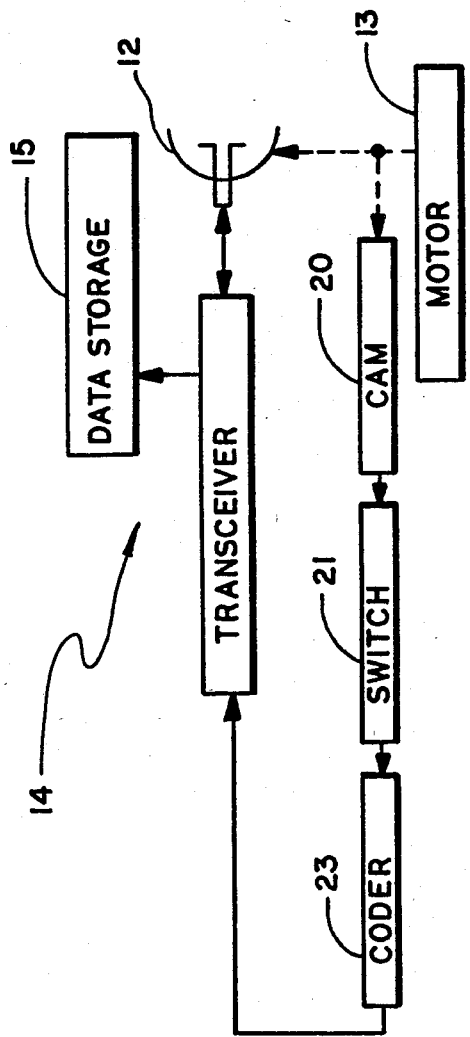
FIG. 3 is a block diagram of a radar which may be employed at each of two sites shown in FIG. 2.

A radar ground system 14 for use at each of the sites 10 is shown in FIG. 3, including an antenna 12 rotatable in azimuth for search by a motor 13.

System 14 includes a transceiver connected to antenna 12. Data storage at 15 may include a data bank 16 and all other structure except an antenna 17 shown in FIG. 5. Alternatively, data storage at 15 may include a data bank 18 and all the other structure shown in FIG. 6 except an antenna 19. Data storage 15 may also include all of FIGS. 5 and 6 except antennas 17 and 19.

In FIG. 3 a cam 20 is provided that is turned by motor 13 that operates a switch 21 when antenna 12 is aligned with a phased array 22 (FIG. 4) at one adjacent site 11. Switch 21 (FIG. 3) then operates a coder 23 that produces a conventionally coded signal. This signal may be generated in the same way as the data transmitted or otherwise. See FIGS. 5-8.

Figure 4:
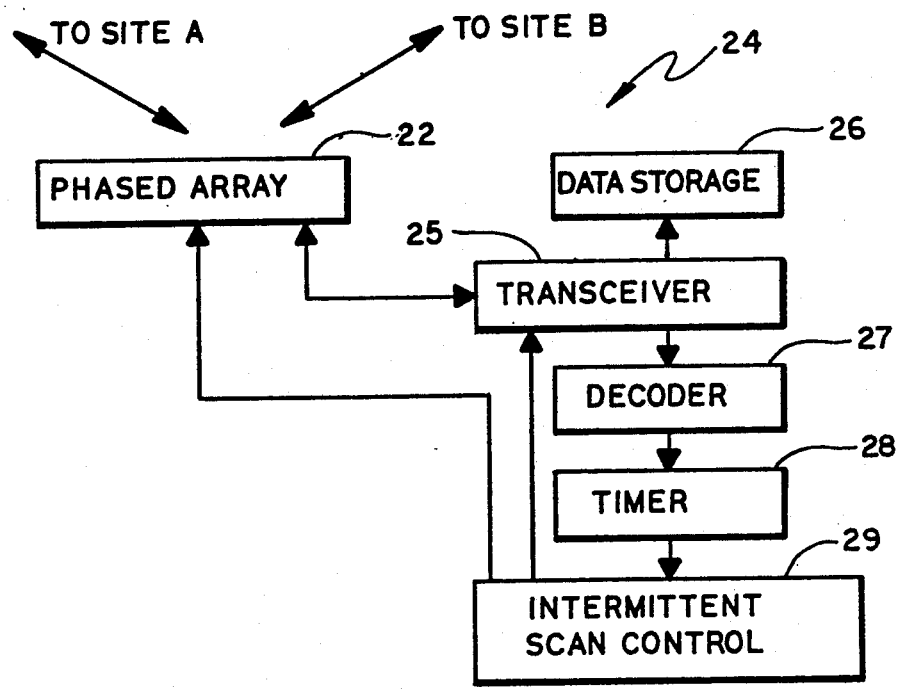
FIG. 4 is a block diagram of a radar which may be employed at a third site shown in FIG. 2.

A system 24 is shown in FIG. 4 for use at each site 11. System 24 is provided with a transceiver 25 connected from phased array 22 to data storage at 26. A decoder 27, a time 28 and an intermittent scan control 29 are connected in succession from transceiver 25 back to phased array 22.

Figure 5:
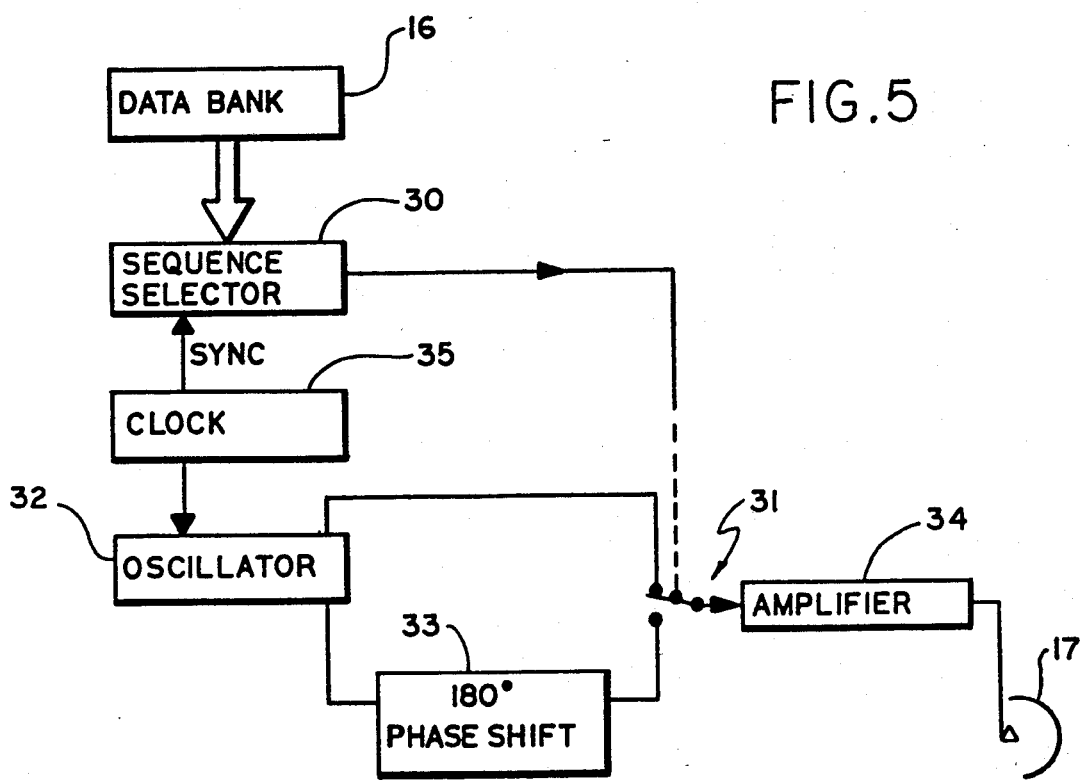
FIG. 5 is a block diagram of a portion of a communications system for use at a transmitting site.
Figure 6:
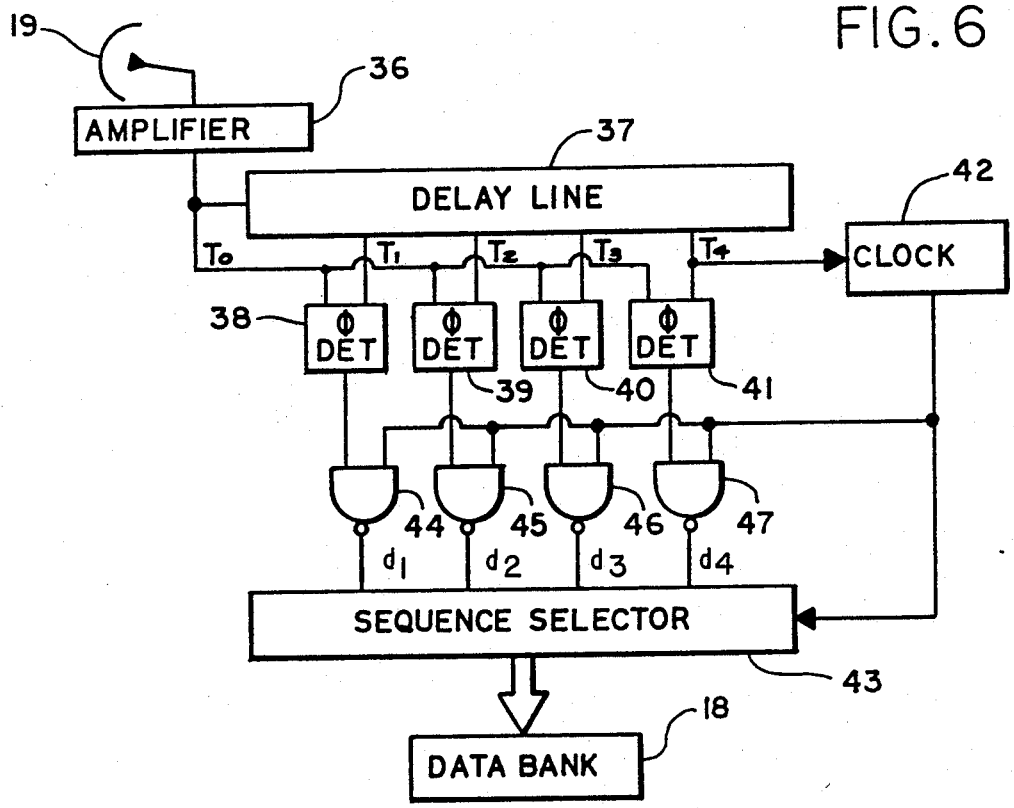
FIG. 6 is a block diagram of the other portion for use at a receiving site.
Figure 7:
FIGS. 7 and 8 are graphs of waveforms characteristic of the operation of the system shown in FIGS. 5 and 6, respectively.
Figure 7:
Figure 7:

Data storage 26 may include all of FIG. 5 except antenna 17, all of FIG. 6 except antenna 19, or all of both FIGS. 5 and 6 without antennas 17 and 19.

Decoder 27 decodes the signal coded by coder 23 by conventional means or in the same way that the data is received or otherwise. Again, see FIGS. 5-8.

Coder 23 may be similar to or the same as the apparatus shown in FIG. 5. Decoder 27 may be similar to or the same as the apparatus shown in FIG. 6.

Timer 28 shown in FIG. 4 is set to cause the beam of the phased array 22, through control 29, to be directed toward site A and/or B for brief periods of time during the 360° rotation of antenna 12 or the rotation of identical antennas at sites A and B.

In FIG. 5, data stored in data bank 16 operates a conventional sequence selector 30 to actuate an electronic switch 31 to connect either an oscillator 32 or a 180° phase shifter 33 to an output amplifier 34. Amplifier 34 has its output connected to antenna 12. A clock 35 synchronizes sequence selector 30 and switch 31 with the phase of oscillator 32.

Figure 8:
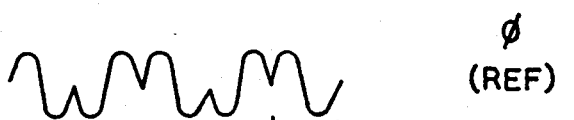
Figure 8:
Figure 8:
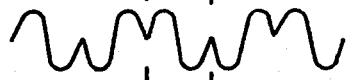
Figure 8:
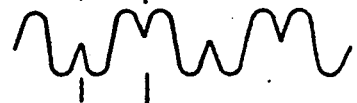
Figure 8:
Figure 8:
Figure 8:
Figure 8:
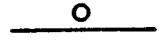
Figure 8:
Figure 8:

FIG. 5 shows representative hardware required at a transmitter site to provide for data modulation of a transmitter pulse. This system uses switch 31 to select the phase of the transmitter radio frequency (RF) energy in accordance with a data stream. In this example, a digit is selected for transmission from the data bank 16 by the sequence selector 30. For illustration the decimal 5 (binary 0101) was chosen. See FIG. 7. FIG. 8 shows how the position of switch 31 is selected by the binary bit stream. Note that an additional zero bit is transmitted as a phase reference (To signal). The switch 31 selects either the 0° or 180° output of oscillator 32 to produce the complex phase modulated wave which is amplified and transmitted.

In FIG. 6 an amplifier 36 is connected from antenna 19 to the input of a delay line 37 and the inputs of phase detectors 38, 39, 40 and 41. The T4 output of delay line 37 is impressed upon a clock 42 connected to a sequence selector 43. Phase detectors 38-41 receive second inputs from T1-T4 outputs of delay line 37, respectively.

The outputs of phase detectors 38-41 are connected to first inputs of respective NAND gates 44-47. Each of the NAND gates 44-47 has a second input from clock 42. The outputs of NAND gates 44-47 are connected to sequence selector 43. The output of sequence selector 43 is connected to data bank 18.

At the receive site in FIG. 6, the signal is first amplified to make up for transmission losses and is then applied to delay line 37 tapped at intervals equal to the switching periods at the transmitter site. These delayed signals (diagrammed in FIG. 8) are applied to the four phase detectors 38-41 which compare two signals and produce a high (binary one) output when the input signals are out of phase and a low (binary zero) when the inputs are in phase. Notice that the last signal transmitted (the reference) is used as one input to each of the phase detectors 38-41 (the last part of To in FIG. 8). T4, the most delayed signal, is used to start a one period clock for timing reference. The outputs of phase detectors 38-41 are gated by the output signal of clock 42 to produce the reconstituted data word 0101. This process can be extended by additional delay segments to transmit more information bits, or more transmit pulses can be sent to expand the data channel.

What is claimed is:

1. A communications system comprising:
    transmitter means including a first clock; an oscillator having 0° and 180° outputs; a single-pole double-throw electronic switch connected to receive selectively said 0° output or said 180° output; first means connected from said switch pole to transmit a coded signal; a first data bank; a first sequence selector, said first clock being connected to said oscillator and to said first sequence selector, said first sequence selector being connected to shift said switch pole to produce a code in accordance with data in said first data bank; receiver means spaced from said transmitter means and including a second clock; means to produce an amplified signal when received; second means to produce delays of 1, 2, 3 ... n bits of said amplified signal; first, second, third ... nth phase detectors to receive inputs according to said 1, 2, 3 ... n bits, respectively, each of said phase detectors having said amplified signal as a second input; first, second, third ... nth NAND gates connected respectively from said first, second, third ... nth phase detectors; a second sequence selector, said second clock being connected from said nth bit to a second input of each of said NAND gates and to said second sequence selector, each of said NAND gates having an output connected to said second sequence selector; and a second data bank connected from said second sequence selector to receive the output thereof.

* * * * *